Nov. 6, 1928.

J. ZUBATY 1,690,356

CLUTCH SHIFTING MECHANISM FOR ODOMETERS

Filed Nov. 28, 1924

INVENTOR
Joseph Zubaty
BY
Blackmore, Spencer & Flint
ATTORNEYS

Patented Nov. 6, 1928.

1,690,356

UNITED STATES PATENT OFFICE.

JOSEPH ZUBATY, OF FLINT, MICHIGAN, ASSIGNOR TO A. C. SPARK PLUG COMPANY, OF FLINT, MICHIGAN, A COMPANY OF MICHIGAN.

CLUTCH-SHIFTING MECHANISM FOR ODOMETERS.

Application filed November 28, 1924. Serial No. 752,664.

This invention relates to the reset mechanism of odometers, and is illustrated as embodied in the trip odometer mechanism of an A C automobile speedometer. An object of the invention is to provide inexpensive and easily assembled clutch shifting mechanism for disconnecting the odometer mechanism from its driving means when it is to be reset. Preferably, axial movement of the spindle which moves the reset gear into operative position is utilized to rock a novel clutch throw-out lever, further discussed below, to separate clutch parts which normally form a connection between the driving means and the odometer mechanism.

Figure 1:
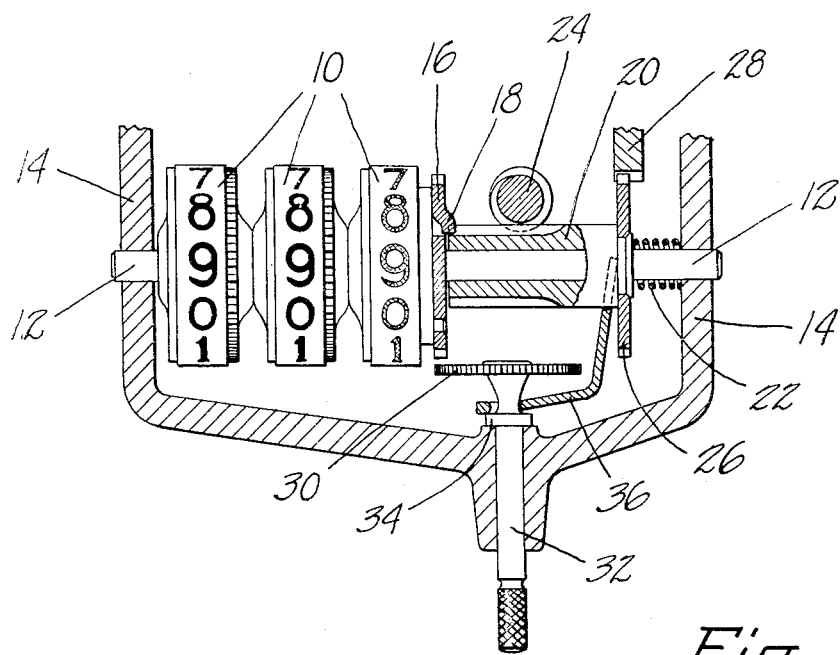
Figure 2:
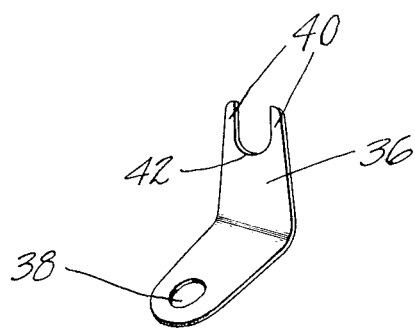

The above and other objects and features of the invention, and the advantages of the described construction, will be apparent from the following description of one illustrative embodiment shown in the accompanying drawings, in which:

Figure 1 is a transverse section through the odometer mechanism, certain parts being in front elevation; and Figure 2 is a perspective view of the novel clutch throw-out lever.

In the arrangement shown, the odometer indicating devices, including the indicator wheels 10 supported on a shaft 12 carried by frame 14, are driven by a driven gear 16 formed to have a clutch part such as one or more axially-offset teeth 18 or the like. The gear is driven, normally, by a worm gear 20, the ends of the teeth of gear 20 forming a clutch part, a pair of the teeth embracing each tooth 18. Worm gear 20 is axially movable on shaft 12, and is urged to the left (Figure 1) by a spring 22. The worm gear is driven by a worm 24 operated by drive mechanism connected to the front wheel or to the transmission of an automobile. Worm gear 20 carries a gear 26 driving one gear 28 of the mechanism (not shown) of a season mileage odometer. Gear 26 forms, in effect, a shoulder on the end of worm gear 20.

The trip odometer devices 10 are reset, when desired, by a gear 30 on a spindle 32, the spindle being at right angles to shaft 12 and therefore to the common axis of the driven gear 16 and of worm gear 20. Spindle 32 has a limited axial movement in its bearing in frame 14, to carry gear 30 into and out of mesh with gear 16. The spindle 32 is formed with a shoulder or collar 34.

The clutch parts of worm gear 20 and gear 16 are automatically separated, against the resistance of spring 22, to permit resetting devices 10, by a bent clutch throw-out lever 36, shown in perspective in Figure 2. Preferably this lever is a metal stamping having an opening 38 embracing spindle 32, with the end of the lever in engagement with shoulder 34. Opening 38 is placed over the end of the spindle before gear 30 is put on and spun in place. The opposite end of the lever is forked to form fingers 40 straddling worm gear 20 and engaging the shoulder formed by gear 26. The bottom edge 42 of the fork in the end of the lever bears against worm gear 20 to provide a sliding fulcrum about which the lever is rocked by the above-described axial movement of spindle 32. It is to be noted that worm gear 20 at all times remains in mesh with worm 24, and that gear 26 at all times remains in mesh with the gear 28, which is wide enough for that purpose.

While one illustrative embodiment of the invention has been described in detail, it is not the intention to limit its scope to that particular embodiment, or otherwise than by the terms of the appended claims.

I claim:

1. In combination, a sliding clutch member, a reciprocating manually operable member movable angularly relative to said clutch member, means operably connecting the manually operable member and the sliding clutch member, including a floating angular plate pivotally engaging the manually operable member at one side of the angle and engaging the sliding member on the opposite side of the angle.

2. In a clutch having a reciprocating operating rod and a movable clutch member, the directions of movement of said rod and clutch member being angularly related to each other, means to convert a rectilinear movement of the rod into an axial movement of the clutch member comprising a freely mounted angular lever having one end engaging the rod and the other end engaging the clutch member.

In testimony whereof I affix my signature.

JOSEPH ZUBATY.